US012811821B2

(12) United States Patent
Moon et al.

(10) Patent No.: US 12,811,821 B2
(45) Date of Patent: Nov. 24, 2026

(54) SERVER AND HOME APPLIANCE SYSTEM INCLUDING THE SAME

(71) Applicant: LG ELECTRONICS INC., Seoul (KR)

(72) Inventors: Junghyun Moon, Seoul (KR); Donghun Kim, Seoul (KR); Yongrak Hwang, Seoul (KR); Jungsun Cho, Seoul (KR); Youngsik Yoon, Seoul (KR); Gaeun Kim, Seoul (KR); Jihye Kim, Seoul (KR); Jongsung Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 67 days.

(21) Appl. No.: 18/930,431

(22) Filed: Oct. 29, 2024

(65) Prior Publication Data

US 2025/0141709 A1 May 1, 2025

(30) Foreign Application Priority Data

Oct. 30, 2023 (KR) ........................ 10-2023-0146862

(51) Int. Cl.
*H04L 12/28* (2006.01)

(52) U.S. Cl.
CPC ........ *H04L 12/2814* (2013.01); *H04L 12/282* (2013.01)

(58) Field of Classification Search
CPC ............. H04L 12/2807; H04L 12/2814; H04L 12/282; H04L 67/303; G06F 3/048; G16Y 20/40; G16Y 10/80
See application file for complete search history.

(56) References Cited

U.S. PATENT DOCUMENTS

| | | | | |
|---|---|---|---|---|
| 2016/0218806 A1* | 7/2016 | Oshima | .................. | H04W 4/50 |
| 2018/0285463 A1* | 10/2018 | Choi | .................. | G06F 16/9535 |
| 2018/0305851 A1* | 10/2018 | Kwon | ................ | H04L 12/2825 |
| 2021/0156068 A1* | 5/2021 | Kim | ........................ | D06F 34/28 |

(Continued)

FOREIGN PATENT DOCUMENTS

| | | |
|---|---|---|
| JP | 2003-087424 | 3/2003 |
| JP | 2006-072836 | 3/2006 |

(Continued)

OTHER PUBLICATIONS

Japan Patent Office Application No. 2024-189569, Office Action dated Nov. 4, 2025, 4 pages.

(Continued)

*Primary Examiner* — Frantz B Jean
(74) *Attorney, Agent, or Firm* — LEE, HONG, DEGERMAN, KANG & WAIMEY

(57) ABSTRACT

A home appliance system includes a home appliance, a terminal configured to determine recommended settings information based on input information; and a server configured to receive the recommended settings information from the terminal and to store the received recommended settings information. Based on delivery of the home appliance being completed and a communication connection being established, the server transmits the recommended settings information to the home appliance, and the home appliance applies the received recommended settings information.

20 Claims, 16 Drawing Sheets

(56) References Cited

U.S. PATENT DOCUMENTS

| | | | | |
|---|---|---|---|---|
| 2021/0297278 A1* | 9/2021 | Lee | D06F 34/05 | |
| 2023/0179636 A1* | 6/2023 | Kimura | H04N 1/00244 | 726/6 |

FOREIGN PATENT DOCUMENTS

| | | |
|---|---|---|
| JP | 2009-051082 | 3/2009 |
| JP | 2022-094595 | 6/2022 |
| KR | 10-2020-0051514 | 5/2020 |
| KR | 10-2020-0123498 | 10/2020 |
| KR | 10-2023-0045456 | 4/2023 |

OTHER PUBLICATIONS

Korean Intellectual Property Office Application No. 10-2023-0146862, Office Action dated Nov. 24, 2025, 6 pages.

European Patent Office Application Serial No. 24209093.4, Search Report dated Mar. 3, 2025, 8 pages.

* cited by examiner

SERVER AND HOME APPLIANCE SYSTEM INCLUDING THE SAME

CROSS-REFERENCE TO RELATED APPLICATIONS

Pursuant to 35 U.S.C. § 119(a), this application claims the benefit of earlier filing date and right of priority to Korean Patent Application No. 10-2023-0146862, filed on Oct. 30, 2023, the contents of which are all hereby incorporated by reference herein in their entireties.

BACKGROUND OF THE INVENTION

1. Field of the Invention

The present disclosure relates to a server and a home appliance system including the same, and more particularly to a server capable of easily applying customized settings to a home appliance and a home appliance system including the same.

2. Description of the Related Art

Home appliances are electrical devices used in home or buildings, such as laundry treatment apparatuses (washing machines, dryers, etc.), refrigerators, and air conditioners.

As home appliances become more sophisticated, various functions are being added to the home appliances. To this end, the ability to download data from servers and update data is required. In addition, the home appliances may provide various additional functions and services by communicating with other devices using a communication module such as a Wi-Fi communication module.

Prior Art Document 1 (Korean Patent Application Publication No. 10-2013-0013238), which relates to a home appliance and an online system including the same, discloses registering the home appliance with a server and using additional services.

In addition, Prior Art Document 2 (Korean Patent Application Publication No. 10-2014-0023986) discloses a laundry treatment apparatus including a display unit and a search unit configured to provide a plurality of treatment courses to a user.

However, with the diversification of home appliance products and the tendency to diversify the functions of each home appliance, there are many settings (functions and detailed settings for each function) that users may select, and the users may experience inconvenience in checking the settings that are necessary or suitable for the users.

For example, it may be inconvenient for users to fully utilize various operation modes (especially automatic operation mode) and personalized temperature control functions of an air conditioners or an air purifier, various courses and detailed settings for each course of a laundry treatment apparatus such as a washing machine or a dryer, and food-specific and area-specific management/control functions of a refrigerator.

Therefore, it may be helpful to effectively check and conveniently provide settings necessary or suitable for the user among various settings that can be performed in a home appliance, so as to resolve inconvenience use.

SUMMARY

One feature is to provide a server capable of easily applying user's customized settings to a home appliance and a home appliance system including the same.

Another feature is to provide a server capable of effectively checking and conveniently providing settings necessary or suitable for a user among various settings available on a home appliance and a home appliance system including the same.

Yet another feature is to provide a server capable of easily and quickly performing product registration and a home appliance system including the same.

According to some features, a server capable of easily registering a product delivered to a customer is based on information related to delivery and a home appliance system including the same.

One feature is to provide a server capable of easily apply recommended settings information determined during delivery to a delivered product and a home appliance system including the same.

Another feature is to provide a server capable of providing various kinds of information to a user during product delivery and a home appliance system including the same.

In a server according to an embodiment of the present disclosure and a home appliance system including the same, when delivery of a home appliance is completed and communication connection is established, the server may transmit recommended settings information to the home appliance, whereby a user may easily set up and use the home appliance.

The recommended settings information may be generated based on information input through a terminal of a user of the home appliance. The recommended settings information may be generated by the server or the terminal.

A home appliance system according to an embodiment of the present disclosure may receive a survey response from a customer using the terminal during a product delivery period, and may store customized settings for the customer corresponding to the response so as to correspond to identification information of the customer.

The home appliance system according to an embodiment of the present disclosure may download the stored customized settings for the customer to the home appliance when the home appliance product is installed and registered with a home appliance management application (app).

A home appliance system according to embodiments of the present disclosure may include a server, a home appliance, and a terminal.

A home appliance system according to an embodiment of the present disclosure includes a home appliance, a terminal configured to receive predetermined information from a user, and a server configured to store recommended settings information based on information input through the terminal, wherein, when delivery of the home appliance is completed and communication connection is established, the server transmits the recommended settings information to the home appliance, and the home appliance applies the received recommended settings information.

The terminal may determine recommended settings information based on the predetermined information, and the server may receive the recommended settings information from the terminal.

Alternatively, the server may receive the predetermined information from the terminal and may determine recommended settings information based on the predetermined information.

In addition, a home appliance system according to an embodiment of the present disclosure includes a home appliance, a terminal configured to determine recommended settings information based on input information, and a server configured to receive the recommended settings information from the terminal and to store the received recommended settings information, wherein, when delivery of the home appliance is completed and communication connection is established, the server transmits the recommended settings information to the home appliance, and the home appliance applies the received recommended settings information.

Alternatively, a home appliance system according to an embodiment of the present disclosure includes a home appliance, a terminal configured to receive predetermined information from a user, and a server configured to receive the predetermined information from the terminal and to store recommended settings information based on the predetermined information, wherein, when delivery of the home appliance is completed and communication connection is established, the server transmits the recommended settings information to the home appliance, and the home appliance applies the received recommended settings information.

Upon receiving delivery completion information of the home appliance, the server may notify the terminal that delivery of the home appliance has been completed.

Upon receiving delivery completion information of the home appliance, the terminal may display a user interface screen configured to guide registration of the home appliance with a management application.

When the management application is executed after the home appliance is registered, the terminal may display a user interface screen configured to provide the recommended settings information. The recommended settings information may include a notification or an inquiry as to whether to apply the recommended settings information.

Alternatively, when the home appliance is registered, the terminal may display a user interface screen configured to provide the recommended settings information. The recommended settings information may be provided in the form of a push alarm. The recommended settings information may include a notification or an inquiry as to whether to apply the recommended settings information.

Alternatively, upon receiving delivery completion information of the home appliance, the terminal may register the home appliance with a management application and may display a user interface screen configured to provide the recommended settings information. The recommended settings information may be provided in the form of a push alarm. The recommended settings information may include a notification or an inquiry as to whether to apply the recommended settings information.

The server may transmit the recommended settings information to the home appliance based on recipient information of the home appliance. The recipient information may be included in delivery information.

The terminal may be a terminal corresponding to the recipient information.

When a recipient of the home appliance is different from a purchasing contractor of the home appliance, a user interface screen provided to the recipient through the terminal may be configured differently from a user interface screen provided to the purchasing contractor through the terminal.

The terminal may provide usage tips information of the home appliance.

A server according to an embodiment of the present disclosure may store the recommended settings information so as to correspond to a user account of the management application of the home appliance.

The server according to the embodiment of the present disclosure may assign a device ID to the home appliance.

The server according to the embodiment of the present disclosure may store the recommended settings information so as to correspond to the device ID.

The server according to the embodiment of the present disclosure may include a first server configured to store the recommended settings information and to transmit the recommended settings information to the home appliance and a second server configured to transmit delivery information to the first server.

The server according to the embodiment of the present disclosure includes a communication interface configured to receive predetermined information input through a terminal during delivery of a home appliance and a memory configured to store recommended settings information based on the information.

When delivery of the home appliance is completed and a communication connection is established, the communication interface may transmit the recommended settings information to the home appliance.

The server may further include a processor configured to determine the recommended settings information based on information received through the communication interface.

Alternatively, the communication interface may receive the recommended settings information from the terminal.

BRIEF DESCRIPTION OF THE DRAWINGS

The embodiments will be described in detail with reference to the following drawings in which like reference numerals refer to like elements wherein.

DETAILED DESCRIPTION OF THE PREFERRED EMBODIMENTS

Figure 1:
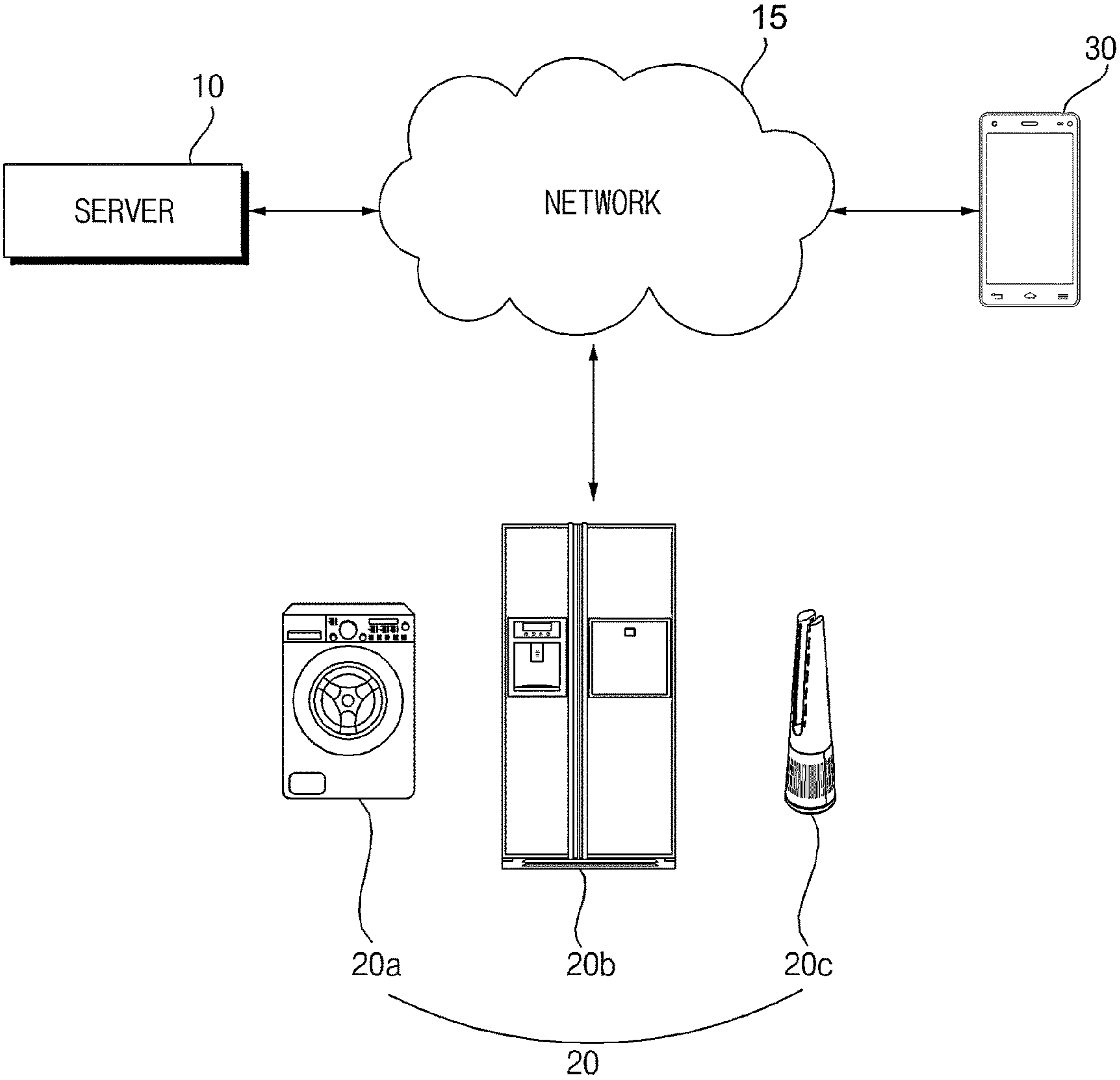
FIG. 1 is a view showing the configuration of a home appliance system according to an embodiment of the present disclosure.

Hereinafter, embodiments of the present disclosure will be described in detail with reference to the accompanying drawings. However, the present disclosure is not limited to these embodiments and may be modified in various forms.

For the purpose of describing the present disclosure clearly and concisely, parts that are not relevant to the description are omitted from the drawings, and the same drawing reference numerals are used for identical or substantially similar parts throughout the specification.

Meanwhile, with respect to constituent elements used in the following description, the suffixes “module” and “unit”

are used or combined with each other only in consideration of ease in the preparation of the specification, and do not have or serve different meanings. Accordingly, the terms "module" and "unit" may be used interchangeably.

In addition, terms, such as "first" and "second," may be used herein to describe various elements, but such elements are not limited by such terms. These terms are used only to distinguish one element from another.

FIG. 1 is a view showing the configuration of a home appliance system according to an embodiment of the present disclosure.

Referring to FIG. 1, the home appliance system according to the embodiment of the present disclosure includes a home appliance 20, a server 10, and a terminal 30.

The home appliance 20 is an electronic device for a user, such as a washing machine 20*a*, a laundry treatment apparatus, e.g., as a dryer, a refrigerator 20*b*, an air conditioner (not shown), an air purifier 20*c*, a cooking appliance (not shown), or a cleaner (not shown), and the like.

The home appliance 20 may have a communication interface (not shown) provided therein and may exchange data with electronic devices over a network 15, which may be an internal network or an external network, or a combination thereof. The communication interface (not shown) may perform data exchange with the server 10, an access point (AP) device, or the like in a wired or wireless manner.

When delivery of the home appliance 20 is completed and communication connection is established, the home appliance system may transmit recommended settings information to the home appliance 20 such that a user can easily set up and use the home appliance 20.

As used herein, the settings information may include at least some of operation courses (modes or cycles) applicable to the home appliance 20, setting values applicable to detailed settings for each operation course (mode), effect information (sound effects, graphics effects, vibration effects, etc.) corresponding to a predetermined operation or event, information about control settings such as remote control and scheduled control, and the like.

The home appliance system may provide recommended settings information to the user. The home appliance system may provide recommended settings information, such as recommending a predetermined operation course (mode) and detailed settings, based on the model of the home appliance 20, the country in which the home appliance is used, or other statistical data.

In some cases, the home appliance system may recommend customized settings information that is personalized to the user. The recommended settings information may be generated based on information input to the terminal 30 of the user of the home appliance 20. The recommended settings information may be generated by the server 10 or the terminal 30, or other device.

The home appliance system may receive survey responses from a customer using the terminal 30 during a product delivery period and may store customized settings for the customer in response to the input so as to correspond to the customer's identification information.

When the home appliance 20 is installed and registered with a home appliance management application, the home appliance system may download the stored customized settings for the customer to the home appliance.

The terminal 30 may be an electronic device capable of communication, e.g., a mobile device that can be carried by a user, such as a smartphone or a tablet computer. In addition, the terminal 30 may be a device used at a fixed location, such as a desktop computer (not shown). If desired, the terminal 30 may be a mobile terminal that is carried and used by an individual user to facilitate the provision of personalized information and services. By way of nonlimiting example, embodiments will be described below in which a mobile terminal 30 is used as the terminal 30. However, such embodiments apply to other types of devices as well.

The home appliance management application, which is an application for registering and controlling the operation of home appliances, may be installed in the mobile terminal 30. The home appliance management application may be implemented using the known ThinQ application, that is commonly available.

The mobile terminal 30 may perform wireless communication with the home appliance 20, may remotely control the wirelessly connected home appliance 20, or may receive monitoring data from the home appliance 20.

The mobile terminal 30 may attempt linkage with the home appliance 20 using a software enabled access point (SoftAP). SoftAP may refer to a software implementation of the functionality of a wireless access point for operation like a wireless AP.

The mobile terminal 30 may run the SoftAP using a wireless LAN module to attempt linkage with the home appliance 20.

The server 10 may transmit and receive data to and from the home appliance 20 connected via a network or the like. For example, the server 10 may provide update information to the home appliance 20 in response to a request from the mobile terminal 30. In another example, the server 10 may provide update information to the home appliance 20 if necessary, even in the absence of a request from the mobile terminal 30 or the home appliance 20.

In some cases, the home appliance 20 may upgrade various settings (predetermined functions, detailed settings for each function, sound effects, motion sounds, etc.). Thus, the home appliance 20 may receive data relating to new settings from the server 10 or the mobile terminal 30 and upgrade the same, thereby expanding various effects without limitation and providing the same to the user. Thus, the home appliance 20 may provide various functions and effects in addition to the settings provided at the time of release of the product.

The home appliance 20 may internally execute a system application, an application related to an operation mode, or a download application, among other functions.

The update information may include firmware update information and software update information. The firmware update information may be data for updating firmware in the home appliance 20, such as update information about load control or safety control of the home appliance 20. The software update information may include upgrade information related to a new operation mode. The operation mode may be upgraded based on the upgrade information related to the new operation mode. The software update information may further include update information for the system application, the application related to the operation mode, or the download application. The operation mode may be updated based on the update information. The firmware update information may include date data for firmware, an operating system, or a framework. The firmware may be updated based on the firmware update information.

The home appliance 20 may receive the upgrade information related to the new operation mode from the server 10 or the mobile terminal 30, or other device, and may upgrade the new operation mode based on the upgrade information related to the new operation mode. The home appliance 20 may also perform updates related to changing detailed settings of the existing operation mode in addition to upgrading to the new operation mode.

The home appliance system may further include an access point (AP) device (not shown). The AP device may provide an internal network to neighboring electronic devices. In particular, the AP device may provide a wireless network. The AP device may assign a wireless channel based on a predetermined communication method to the electronic devices in the internal network, and may perform wireless data communication via the channel. Here, the predetermined communication method may be a Wi-Fi communication method.

In this case, the mobile terminal 30 located in the internal network may be connected to the home appliance 20 via the AP device to perform monitoring, remote control, etc. of the home appliance 20.

The AP device may also perform data communication with external electronic devices via an external network in addition to the internal network. For example, the AP device may perform wireless data communication with a mobile terminal 30 located outside via the external network. In this case, the mobile terminal 30 located in the external network may be connected to the home appliance 20 via the external network and the AP device to perform monitoring, remote control, etc. of the home appliance.

In another example, the AP device may perform wireless data communication with a server 10 located outside via an external network.

Meanwhile, the server 10 may store firmware information and operation information (such as course information) for the home appliance 20, and may register product information for the home appliance 20. For example, the server 10 may be a server operated by a vendor of the home appliance 20.

Figure 2:
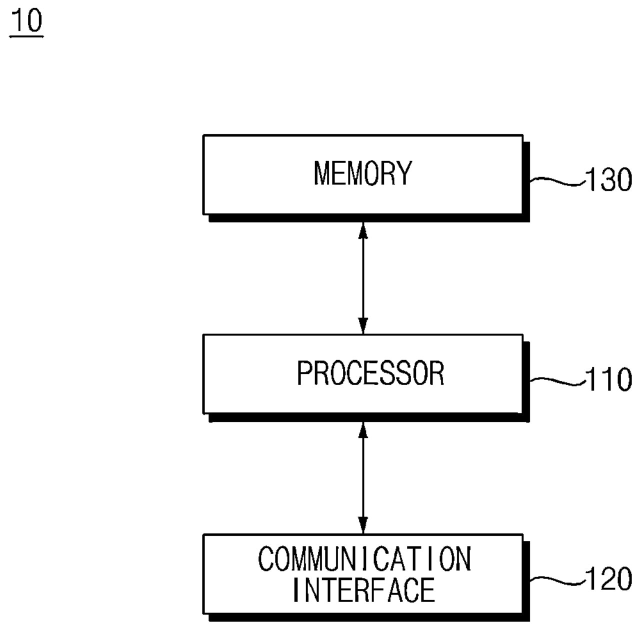
FIG. 2 is a block diagram of main components of a server according to an embodiment of the present disclosure.

FIG. 2 is a block diagram of main components of a server according to an embodiment of the present disclosure. Referring to FIG. 2, the server 10 includes a communication interface 120, a memory 130, and a processor 110.

The communication interface 120 may communicate with the mobile terminal 30, the home appliance 20, or another server, using known wireless, wired, and combinations thereof, technologies. For example, communication technologies used by the communication interface 120 include Global System for Mobile communication (GSM), Code Division Multiple Access (CDMA), Long Term Evolution (LTE), 5G, Wireless LAN (WLAN), and Wireless Fidelity (Wi-Fi). The communication interface 120 may be implemented using appropriate hardware components, such as transceiver.

The memory 130 may store various data, e.g., data received from external devices, such as the home appliance 20, the terminal 30, and the other server, and data generated in the server 10. The memory 130 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory (e.g., secure digital (SD) or extreme digital (XD), or other similar memory or data storage device.

The server 10 may receive predetermined information input through the terminal 30 during delivery of the home appliance 20 via the communication interface 120. For example, the terminal 30 may request a user to respond to a survey to provide a personalized service during delivery of the home appliance 20, and may transmit the survey input from the user to the server 10.

The memory 130 may store the user's responses to the survey received from the terminal 30, or recommended settings information. In addition, the memory 130 may store information related to the home appliance 20. For example, the memory 130 may store delivery information of the home appliance 20. The delivery information may include user information, a logistics barcode, and a serial number. In addition, the memory 130 may store a plurality of MAC addresses of a plurality of home appliances 20 and a plurality of serial numbers corresponding to each of the plurality of MAC addresses.

In addition, when the delivery of the home appliance 20 is completed and communication connection is established, the communication interface 120 transmits the stored recommended settings information to the home appliance 20.

The processor 110 may control the overall operation of the server. In addition, the processor 110 may generate an automatic registration key for automatic registration of the home appliance 20, or may determine whether the home appliance 20 should be registered. The processor 110 may further include determining recommended settings information based on information received through the communication interface 120 (e.g., a user's survey response sent from the terminal 30).

Various embodiments described herein may be implemented in a non-transitory computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controllers or processors included in the various apparatuses disclosed herein (e.g., server 10, home appliance 20, terminal 30, and the like).

In some embodiments, the recommended settings information may be determined by the terminal 30. In this case, the server 10 may receive the recommended settings information from the terminal 30 through the communication interface 120.

By way of example, product registration, recommendation and application of customized setting, and various kinds of information provided during delivery of the home appliance 20 will be described in detail with reference to the drawings.

Figure 3:
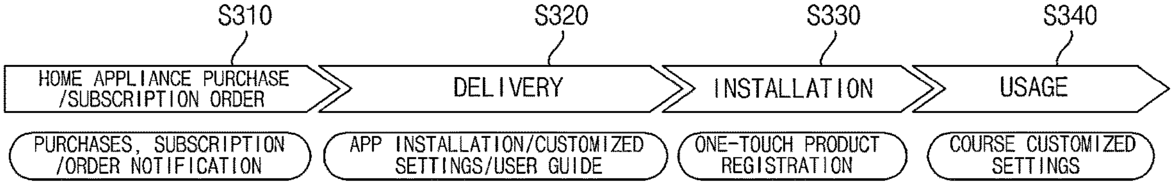
FIG. 3 is a view showing a process from purchase or subscription of a home appliance to use by a user in an embodiment of the present disclosure.

FIG. 3 is a view of process from purchase or subscription of a home appliance to use by a user in an embodiment of the present disclosure. FIGS. 4 to 8 are views showing information and user interface screens provided during the process from purchase or subscription of the home appliance to use by the user.

Referring to FIG. 3, in a purchase process S310, a user may proceed to purchase a home appliance 20 in a variety of ways. For instance, purchasing the home appliance 20 may include not only a contract to buy and fully own the home appliance 20 but also subscribing to a subscription service for the home appliance 20. In addition, a seller of the home appliance 20 may include a subscription service provider of the home appliance 20.

The subscription service may include a service for using the home appliance 20 in exchange for a periodic payment of a certain amount of money. In addition, the subscription service may include a service for using the home appliance 20 and a service for managing the home appliance 20. In addition, the subscription service may include only a service for managing the purchased home appliance 20. When the user purchases the home appliance 20 or subscribes to the subscription service, the seller may provide the user with notification regarding the order. The delivery S320, installation S330 and usage S340 feature will be described below.

Figure 4:
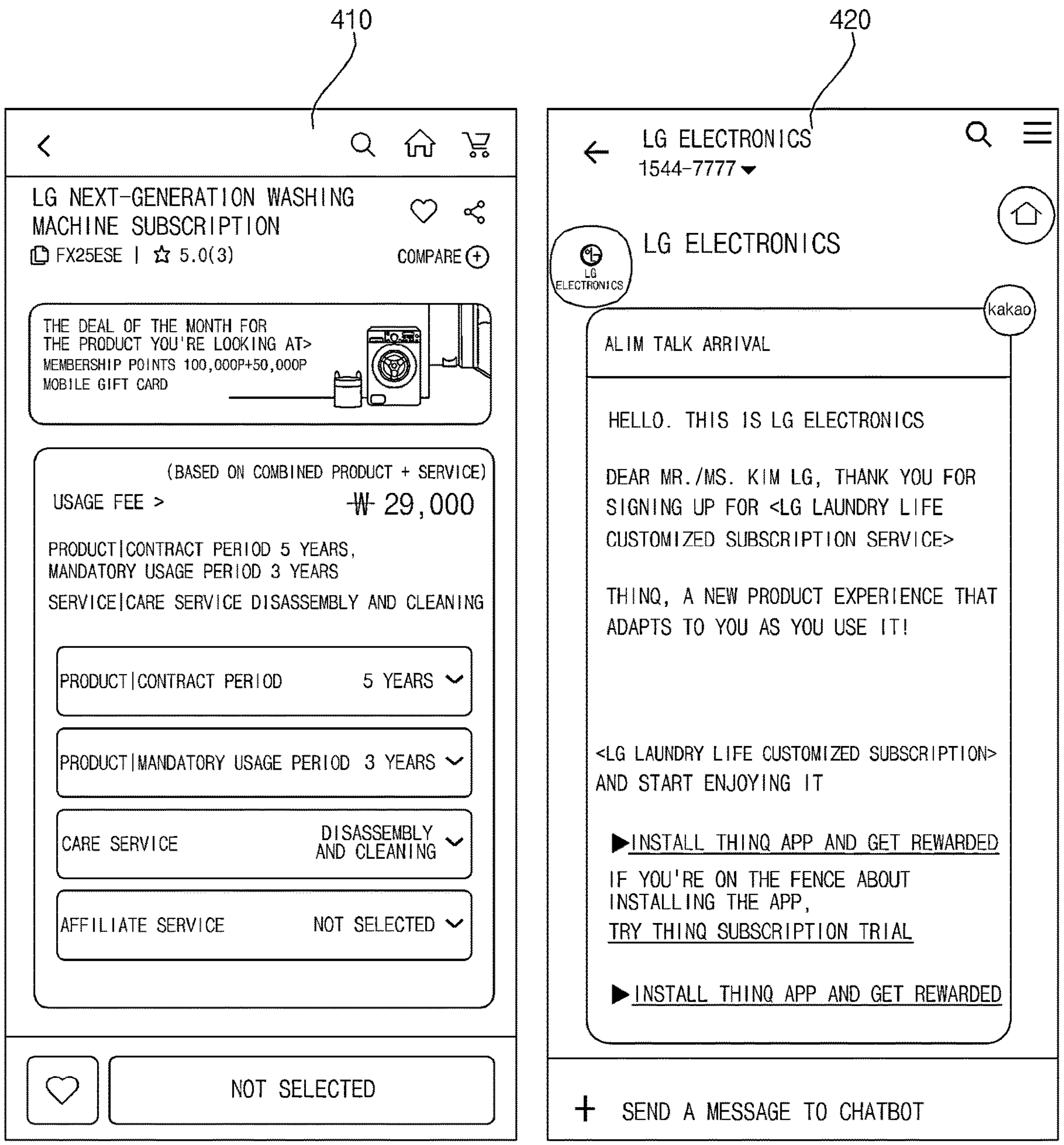
FIGS. 4 to 8 are views showing information and user interface screens provided during the process from purchase or subscription of the home appliance to use by the user.

FIG. 4 illustrates an example of the user subscribing to a subscription service for a washing machine, and illustrates a subscription screen 410 and a notification message 420 corresponding to the subscription.

Referring to FIG. 4, the subscription screen 410 may be provided to the user through the mobile terminal 30 to proceed with the subscription process. In conjunction with the purchase of the home appliance 20, the user may set up management services provided by the seller or the like. For example, the user may contract with the seller or the like by selecting a management period, a management method, etc. for the home appliance 20 to be managed by the seller or the like.

The subscription screen 410 may provide various kinds of information for the user to determine the management period and the management method, and information related to the subscription may be input by the user.

The user may view the subscription service contract for the home appliance 20 through the notification screen 420 and may be provided with information related thereto. For example, the notification screen 420 may include promotional information such as discounts, coupons, and rewards, and information about the home appliance management application (e.g., ThinQ application) to enhance the user experience.

After purchase (or subscription), the seller of the home appliance 20 may deliver the home appliance 20 to the user in a variety of ways. In addition, notifications may be provided to the user as the user progresses through the process. For example, an order notification upon completion of the order, a confirmation notification while the order is being prepared for delivery, a notification on the day of delivery, and a completion notification after delivery may be sent to the user.

In addition, during the delivery (S320) of the home appliance 20, various kinds of information may be provided to the user. The information provided during the delivery may be referred to as onboarding information.

Figure 5:
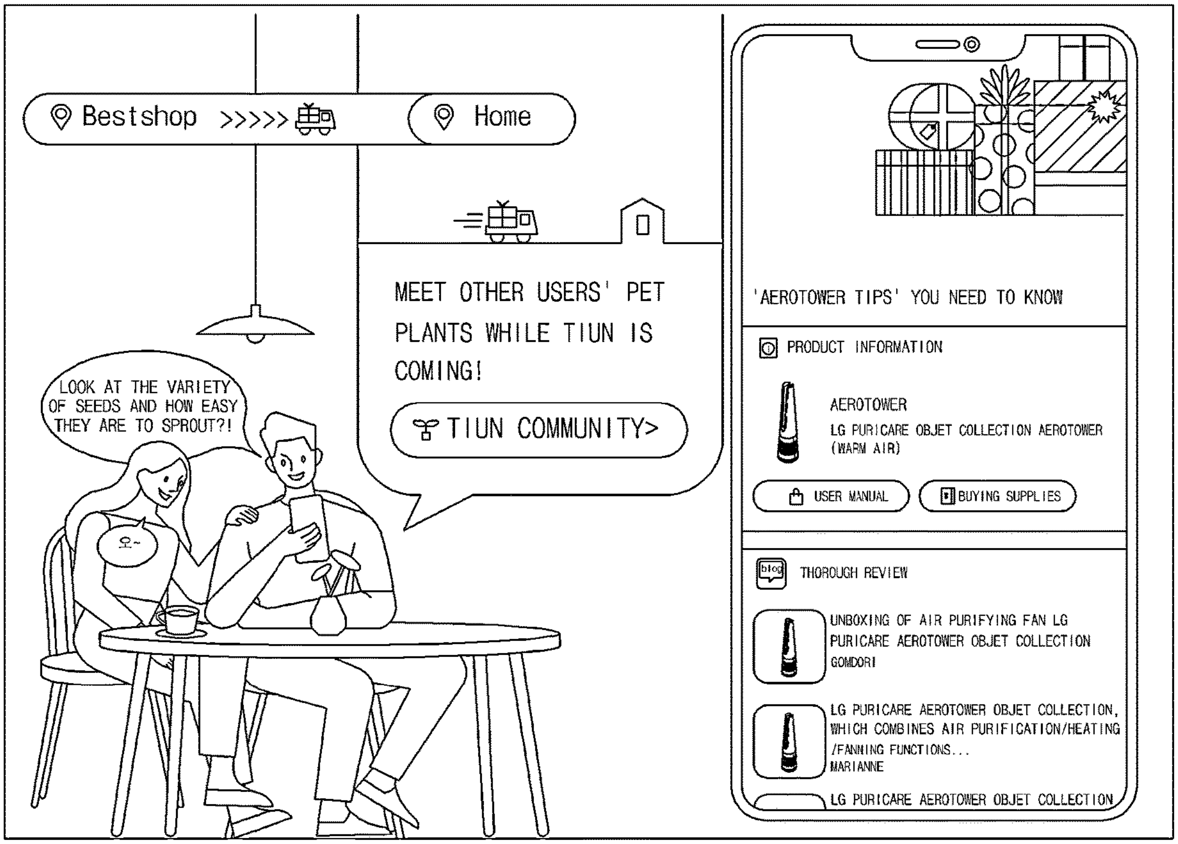

FIG. 5 illustrates onboarding information provided to the user's mobile terminal 30 during the delivery (S320) of the home appliance 20.

While the user is waiting for delivery of the home appliance 20, the seller may provide the user with product usage tips. In addition, the seller may provide product information, related communities, usage tips, and various user reviews to amplify the user's excitement, may provide a sense of personalized service even before delivery, and may help the user better use the home appliance 20.

While waiting for delivery of the home appliance 20 after purchasing, the user may visually check product information and other customers' actual use experiences, which may be used as a kind of product usage guide. In addition, an onboarding screen including the onboarding information includes a line chat function, which allows for immediate resolution of customer inquiries during delivery.

During the delivery process (S320), a settings recommendation process in which the settings information provided to the user through the home appliance 20 may be performed. For example, in an embodiment, before the home appliance 20 is installed, the server 10 or the terminal 30 may determine the recommended settings information by receiving the information from the user through an input process in which the user provides the information.

Figure 6:
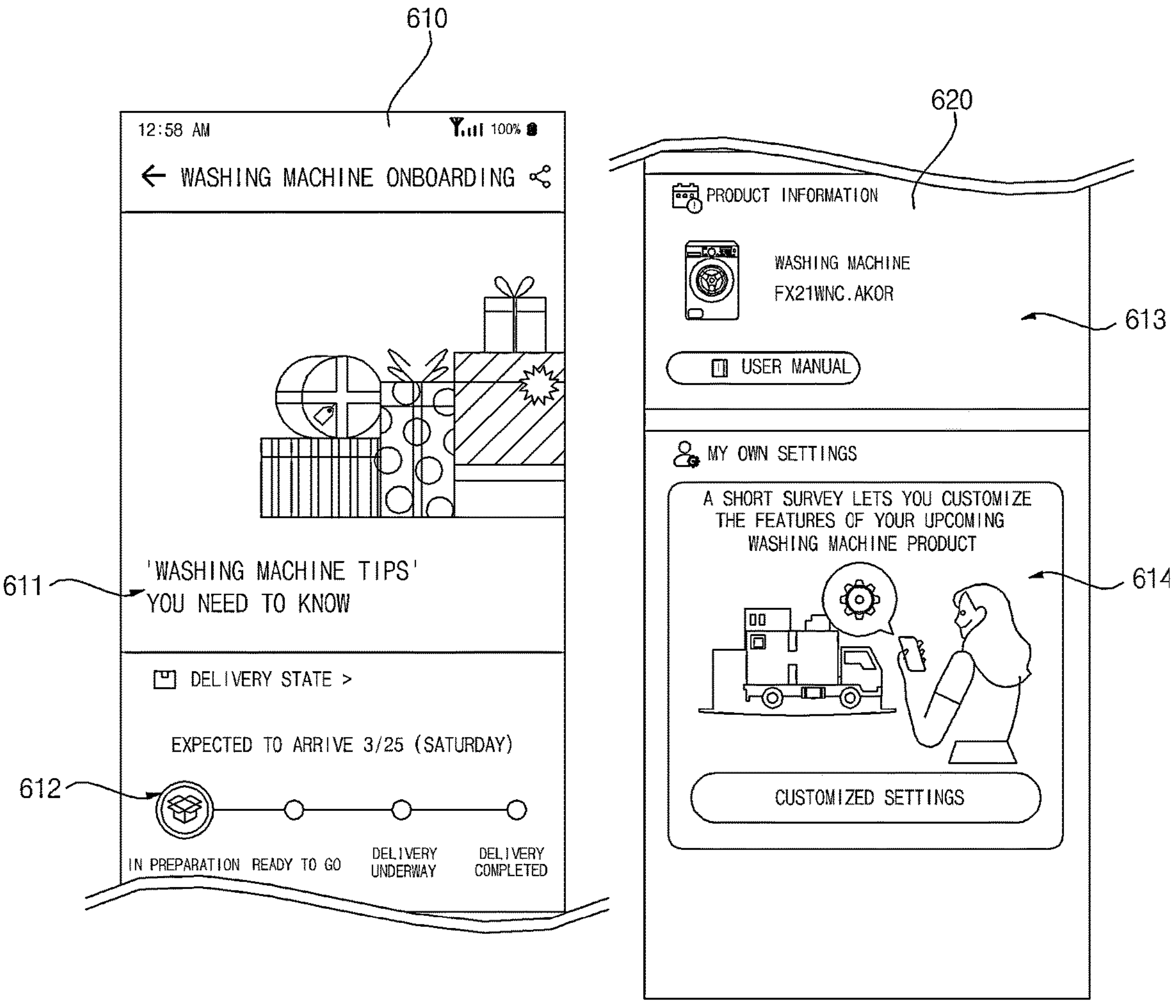

FIG. 6 illustrates onboarding screens 610 and 620 provided during delivery (S320) according to execution of the home appliance management application or connection of a link provided in a notification message.

The seller may naturally be provided a subscription appliance onboarding screen through various notification channels of the home appliance management application and may connect a purchase/subscription information and product personalization screen to build excitement for the product before delivery.

The onboarding screens 610 and 620 may be provided through the mobile terminal 30. The user may check the information contained in the onboarding screens 610 and 620 using the mobile terminal 30 and may perform predetermined input as needed. The onboarding screens 610 and 620 may include a large number of menu items and information, which may not all be displayed on a single screen. In this case, the user may check additional information by scrolling or page changing.

FIG. 6 illustrates a first scrollable onboarding screen 610 and a second onboarding screen 620 under the first onboarding screen 610. The onboarding screens 610 and 620 may include a usage tips item 611, a delivery information item 612, a product information item 621, and a customized setting item 622. The usage tip item 611, the delivery information item 612, the product information item 621, and the customized setting item 622 may be disposed from top to bottom, and as the user scrolls, and the predetermined items may be displayed on the screen of the mobile terminal 30.

The usage tips item 611 may display usage tips for the home appliance 20. In addition, when the user selects the usage tips item 611, more usage tips may be displayed.

The delivery information item 612 may display information related to delivery of the home appliance 20. In addition, when the user selects the delivery information item 612, more detailed information may be displayed.

The user may select the product information item 621 to check detailed information about the home appliance 20.

In addition, the user may select the customized setting item 622 to input information for personalized customized settings. For example, selecting the customized setting item 622 may result in a survey and response-based settings recommendation process.

The settings recommendation process may include at least one suggestion process to ask the user if the user wishes to proceed with determining the recommended settings information through the server 10 or the terminal 30, an input process in which the user inputs information to determine the recommended settings information, a provision process in which the server 10 or the terminal 30 determines the recommended settings information based on the information input by the user and notifies the user of the same, and a modification process in which the user reflects or modifies the recommended settings information.

The seller may provide the onboarding service in real time by linking the server 10 to information from the sales channel.

After the purchase and delivery processes (S310 and S320), an installation process (S330) of the home appliance 20 may proceed. In the installation process (S330), the home appliance 20 may be installed for use at an installation position required or desired by the user.

In the installation process (S330), a product registration process and a recommended settings information storage process of the home appliance 20 may be performed. The recommended settings information storage process may also be performed in the usage process (S340).

In the product registration process and the recommended settings information storage process, the home appliance 20 may be energized and allowed to communicate with the server 10 and/or the terminal 30. During the initial communication of the home appliance 20, the product registration process and the recommended settings information storage process may be performed. The home appliance 20 may receive and store the recommended settings information from the server 10 or the terminal 30.

Figure 7:
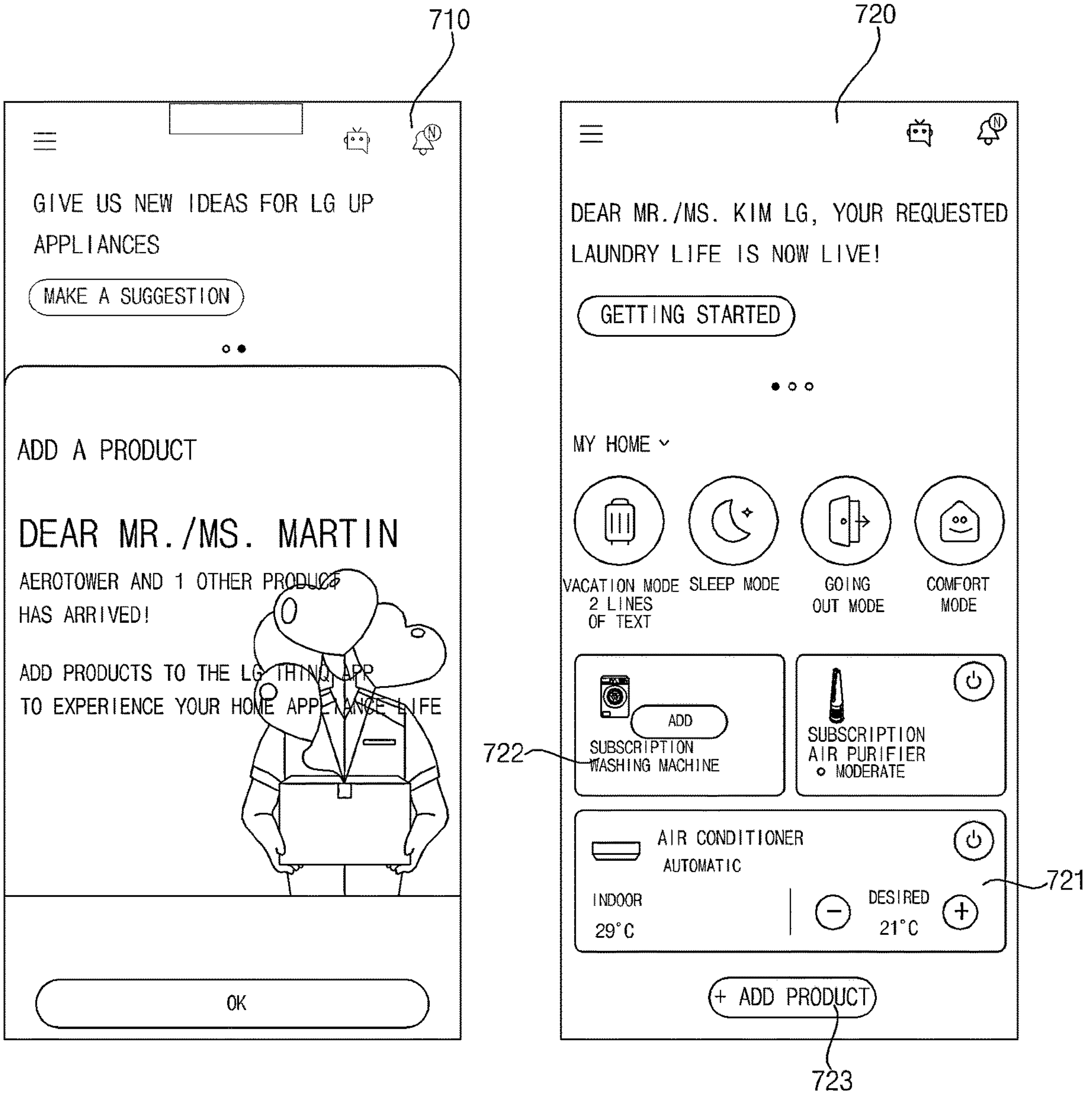

FIG. 7 illustrates user interface screens 710 and 720 provided through the home appliance management application during the product registration process (S330).

When delivery is completed, the product is powered on, the home appliance management application is executed, and the user interface screens 710 guide delivery completion and product registration.

The server 10 may provide onboarding information to the customer based on the delivery information, which may include at least one of unique information of the home appliance 20 to be delivered, such as a serial number, a delivery/receipt date, and customer information.

In addition, the delivery information may include delivery completion information. The server 10 may obtain delivery completion information indicating that the delivery of the home appliance 20 has been completed.

In an embodiment, the delivery completion information may include at least one of a serial number of the delivered home appliance 20, logistics barcode, user information of the owner of the delivered home appliance 20, and the like.

The user information may include a user ID of the home appliance management application or information identifying a user related to the user ID. The serial number of the home appliance 20 may be a unique number of the home appliance 20 and may be a character code used to authenticate that the home appliance 20 is genuine and purchased from a headquarters or a dealer. The logistics barcode may be a code for identifying a country, a manufacturer, the type of a product, etc. The logistics barcode may also be configured in the form of a QR code.

The server 10 may receive delivery completion information from a terminal of a delivery, or other person, of the delivered home appliance 20.

A product information item including product information may be attached to a box used to deliver the home appliance 20. Alternatively, the product information item including the product information may be attached to one surface of the home appliance 20.

The delivery person may read the serial number or the logistics barcode included in the product information item through his/her terminal (not shown). That is, the product information item may include a serial number or a logistics barcode (or a QR code). The delivery person's terminal may transmit the scanned serial number or logistics barcode to the server 10.

Upon receiving the delivery completion information, the server 10 may notify the terminal 30 that the home appliance 20 has been delivered. In addition, when the delivery completion information of the home appliance 20 is received, the terminal 30 may display a user interface screen that guides registration of the home appliance 20 with the home appliance management application.

In addition, when the home appliance 20 is registered, the terminal 30 may display a user interface screen that provides recommended settings information. That is, when delivery is completed, the terminal may transmit a push alarm (e.g., a message) of delivery completion and product registration for the home appliance management application, and may notify/inquire whether to apply the recommended settings after registration is completed.

Alternatively, when the management application is executed after the home appliance 20 is registered, the terminal 30 may display a user interface screen that provides information about the recommended settings. That is, when delivery is completed, the terminal may transmit a push alarm of delivery completion and product registration for the home appliance management application, and may notify/inquire whether to apply the recommended settings on a first screen when the home appliance management application is executed after registration is completed.

According to various embodiments, upon receiving the delivery completion information of the home appliance 20, the terminal 30 may register the home appliance 20 with the home appliance management application and display a user interface screen to provide the recommended settings information. That is, upon delivery completion, the terminal 30 may automatically register the home appliance 20, may transmit a push alarm of the delivery completion and the home appliance management application product registration, and may notify/inquire whether to apply the recommended settings.

The home appliance management application may provide a push alarm to the user when the purchased product is delivered. In addition, the home appliance management application may provide a product registration guide in consideration of a user-specific product registration entry point, and may be automatically connected to the delivered home appliance 20 with a single touch input.

The user interface screen 720 (FIG. 7) provided by the home appliance management application may include an existing card 721 for an existing home appliance and an easy addition card 722 for a newly delivered home appliance 20 that can be added.

The user may automatically register the home appliance 20 with a single operation (e.g., click, touch, voice command) on the easy addition card 722 on the user interface screen 720 provided in the home appliance management application. Accordingly, the user may easily connect the purchased product to the home appliance management application.

Depending on embodiments, if a delivered product is found in the vicinity during Wi-Fi or Bluetooth scanning, for example, the corresponding easy addition card 722 may shake. Meanwhile, if the delivered home appliance 20 is first registered in the location, it may be necessary to input information of a router to be connected.

The user interface screen 720 may further include a product add item 723, and the user may select the product add item 723 and register the product individually.

After the installation process (S330), a usage process (S340) of the home appliance 20 by the user may proceed. In the usage process (S340), the stored recommended settings information may be applied to the home appliance 20. For example, the home appliance 20 may provide washing courses in the recommended settings information so as to be selected by the user. The home appliance 20 may display courses in a course group via a display (not shown) so as to be recognized by the user, and the user may select any of the courses in the course group and may command the course to be performed.

According to an embodiment, after purchasing the home appliance 20, predetermined information is input by the user through the mobile terminal 30 during the delivery period. For example, the mobile terminal 30 receives responses to a plurality of surveys from the user.

The mobile terminal 30 transmits the user responses to the server 10, and the server 10 may generate recommended settings information including settings. Alternatively, the mobile terminal 30 may generate recommended settings information including customized settings based on the user's responses.

The server 10 may store the directly generated recommended settings information so as to correspond to a user's account. Alternatively, the server 10 may store the recommended settings information received from the mobile terminal 30 so as to correspond to the user's account.

After purchasing the home appliance 20, the customer's "customized settings" may be stored in the customer's ID using the mobile terminal 30 and the home appliance management application through a brief survey during the delivery period. In addition, when the preset "customized settings" are registered in the home appliance management application using the mobile terminal 30 after installation of the home appliance 20, the "customized settings" stored so as to correspond to the customer ID are downloaded to the home appliance 20.

In addition, a plurality of operation courses (operation modes or cycles) may be prepared in advance for the user, and among the plurality of settings, a course suitable for the user may be conveniently categorized and provided to the user. Furthermore, the user does not need to check each of the plurality of courses in the use process (S340) of the home appliance 20 or manually categorize the suitable course among the plurality of courses, which may improve ease of use.

Figure 8:
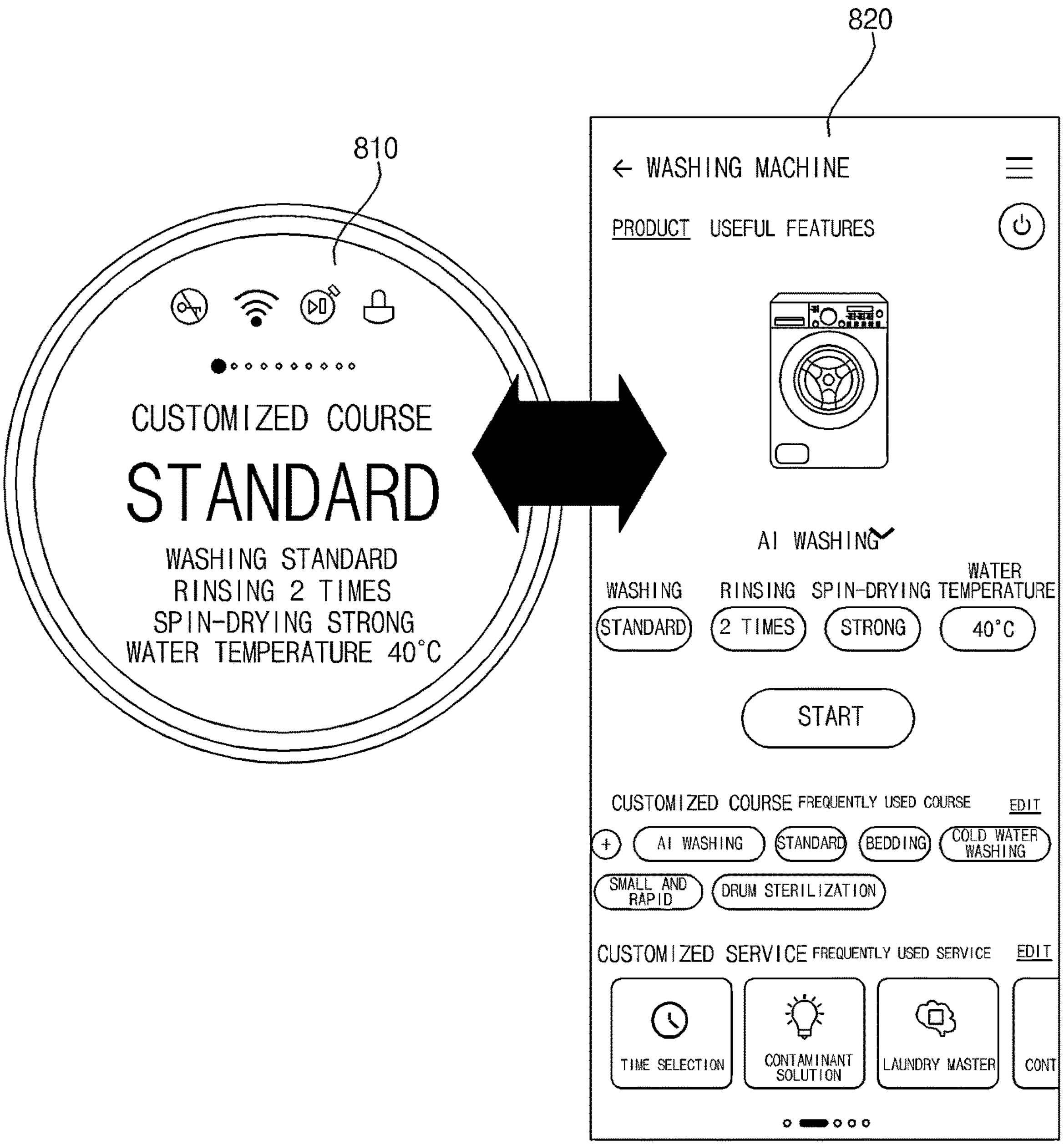

FIG. 8 illustrates an artificial intelligent washing course (e.g., cycle) generated based on a user's survey response, wherein a course selection screen 810 of the washing machine 20*a* and a washing machine course setting screen 820 of the mobile terminal 30 are shown.

The course selection screen 810 may display the courses of the course group. The course selection screen 810 may be provided to the user when the recommended settings information storage process ends. The data stored in the washing machine 20*a* through the recommended settings information storage process may include a course group including a plurality of selectable courses. At least some of the courses may be based on the recommended settings information. The course selection screen 810 may include a course (e.g., a customized course or artificial intelligent washing customized course) based on the recommended settings information.

Specifically, the course selection screen 810 may include a course display area, and the course display area may display information indicating which course is currently being displayed on the course selection screen 810. For example, the course display area may display a character or a shape to indicate the type of course, such as the name of the course.

The courses in the course group determined through the server 10 or the mobile terminal 30 may be stored in the washing machine 20*a* and be provided to the user. For example, the course selection screen 810 may display the courses in the course group, and the user may command the course displayed on the course selection screen 810 to be performed through a manipulation unit such as an execution button.

The course selection screen 810 may display only some of the courses in the course group due to limitations of the display output area. For example, the course selection screen 810 may display any one of the courses in the course group, and the user may change the course displayed on the course selection screen 810 to another course by input through the manipulation unit.

In some embodiments the settings may have a plurality of options, each of which may have a detailed setting value that may be changed. The course selection screen 810 may include an option display area, and the option display area may display a current setting value for at least one option that is set in the course displayed on the course selection screen 810.

The washing machine course setting screen 820 of the mobile terminal 30 may also display information indicating what the predetermined course is along with the detailed setting value for the course. For example, detailed setting value information about washing, rinsing, spin-drying, and water temperature for the prescribed course may be included.

In addition, the washing machine course settings screen 820 may further include other customized course items, and other customized service information item as well. The user may manipulate the course setting screen 820 to change the course group, the course-specific detailed setting value, and the like.

When delivery of the home appliance 20 is completed and communication connection is established, the server 10 transmits the recommended settings information stored in the corresponding account to the home appliance 20. The home appliance 20 applies the received downloaded recommended settings information. Accordingly, settings that are necessary or suitable for the user may be pre-applied to the home appliance 20 before the home appliance 20 is provided to the user, thereby improving ease of use.

Figure 9:
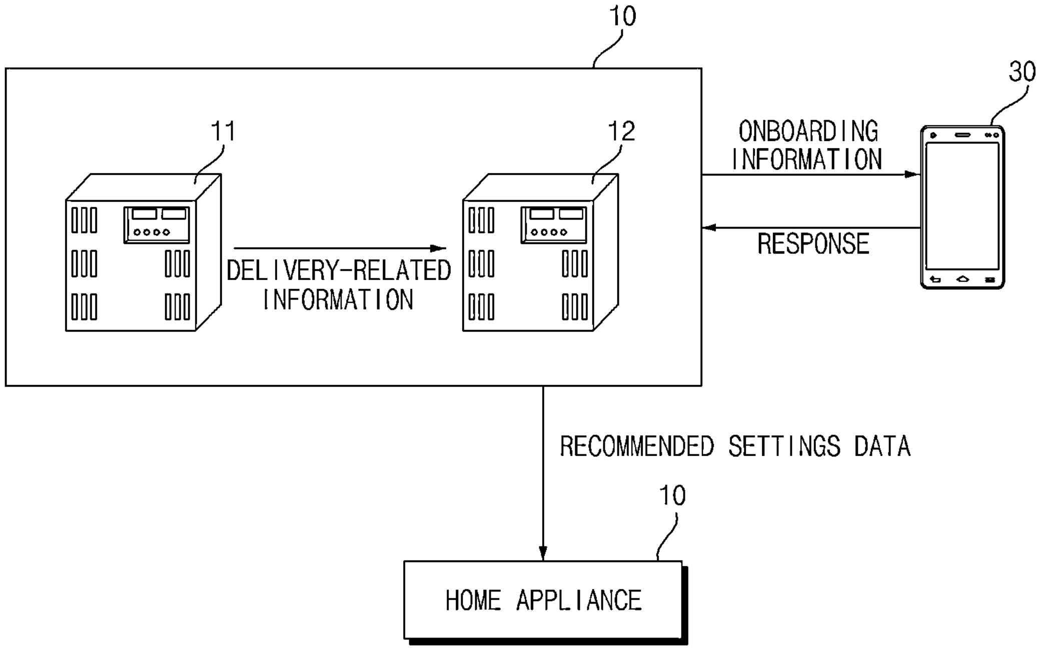
FIG. 9 is a view showing the configuration of a home appliance system including a home appliance according to an embodiment of the present disclosure.

FIG. 9 is a view showing configuration of a home appliance system including a home appliance according to an embodiment. Referring to FIG. 9, a server 10 may include a first server 12 configured to store recommended settings information and to transmit the recommended settings information to a home appliance and a second server 11 configured to transmit delivery information to the first server 12.

The home appliance system is shown having the first server 12, the second server 11, a mobile terminal 30, and a home appliance 20. When a user purchases the home appliance 20, purchase information of the home appliance 20 may be registered with the second server 11. The purchase information may be user information or the model name of the home appliance 20, and the user information of the home appliance 20 may be a user ID for accessing a home appliance management application.

The second server 11 may communicate the purchase information and the product information of the home appliance 20 to the first server 12. The product information may include a serial number or a logistics barcode of the home appliance 20. In addition, the second server 11 may transmit MAC addresses and serial numbers of mass-produced home appliances 20 to the first server 12. The MAC address of the home appliance 20 may be a unique address that uniquely identifies the home appliance 20. The serial number of the home appliance 20 may be a character code used to authenticate that the product is genuine.

The first server 12 may store the received MAC address and serial number of the home appliance 20 in a database. That is, the first server 12 may map and store the MAC address and serial number corresponding to each of the plurality of home appliances 20.

While the first server 12 and second server 11 are shown as separate components in the figure, greater or fewer servers may be implemented. For instance, the functionality of the first server 12 and the second server 11 may be implemented in a single server.

The delivery information may include purchase/customer information. In addition, the delivery information may further include a serial number and delivery/receipt date information. Upon completion of delivery, the delivery information may include delivery completion information.

The first server 12 may provide various kinds of onboarding information through the terminal 30 during delivery.

A user who desires customized settings may respond to a survey related to the customized settings through the home appliance management application and the terminal 30. The terminal 30 may transmit the user response to the first server 12, and the first server 12 may analyze the user response to generate customized recommended settings information.

Alternatively, the terminal 30 may directly generate the recommended settings information and transmit the recommended settings information to the first server 12.

The first server 12 stores the model name and the MAC information of the new product based on the delivery information. In addition, the first server 12 stores the recommended settings information so as to correspond to the user account of the home appliance management application.

When the delivery is completed, the first server 12 may transmit a push alarm to the user's terminal 30. In addition, upon completion of the delivery, the first server 12 transmits the stored recommended settings information to the home appliance 20.

The first server 12 may assign a device ID to the home appliance 20 upon product registration, and may download personalization data based on the device ID.

The home appliance 20 applies the recommended settings information downloaded from the first server 12. Here, the recommended settings information may also be referred to as initial personalization information, since the recommended settings information is personalized customized settings applied from the beginning of product use.

The home appliance 20 may be easily registered and set up in the home appliance management application based on the delivery information (easy set-up).

Based on the delivery completion information, the first server 12 transmits a push notification to the user's terminal 30. Based on the user information included in the delivery completion information, the first server 12 may transmit a push notification to the user's mobile terminal 30 through the home appliance management application. In an embodiment, the push notification may be a notification indicating that the delivery of the home appliance 20 has been completed. In another embodiment, the push notification may be a notification that the delivery of the home appliance 20 has been completed and registration of the delivered home appliance 20 is required.

The terminal 30 executes the home appliance management application based on the received push notification.

Based on the delivery information response, the first server 12 may generate an automatic registration key for automatic registration of the home appliance 20. The automatic registration key may be a key that is valid only for a predetermined amount of time. That is, the automatic registration key may be a key that is valid only for a predetermined amount of time, such as a one-time password (OTP).

The first server 12 may transmit the generated automatic registration key and delivery information to the terminal 30. The terminal 30 retrieves the home appliance 20 based on the delivery information.

The mobile terminal 30 may retrieve the home appliance 20 using the MAC address included in the delivery information. In addition, the mobile terminal 30 may activate the SoftAP to determine if the device having the MAC address has been retrieved.

The mobile terminal 30 transmits a linkage request to the retrieved home appliance 20 through the automatic registration key. The mobile terminal 30 may transmit the automatic registration key to the home appliance 20. The mobile terminal 30 may encrypt the automatic registration key and transmit the same to the home appliance 20.

In response to the linkage request, the mobile terminal 30 and the home appliance 20 exchange information with each other and complete the linkage based on the exchanged information. After the linkage with the home appliance 20 is completed, the mobile terminal 30 transmits a product registration request for registration of the home appliance 20 to the first server 12. The product registration request may include user information, a MAC address, and an automatic registration key.

In response to the product registration request, the first server 12 proceeds to register the home appliance 20 and transmits a product registration response indicating the registration result to the mobile terminal 30.

In the same manner, after the linkage with the home appliance 20 is completed, the home appliance 20 transmits a product registration request for registration of the home appliance 20 to the first server 12.

In response to the product registration request, the first server 12 registers the home appliance 20 and transmits a product registration response indicating the result of the registration to the home appliance 20.

In an embodiment, the first server 12 may compare the automatic registration key received from the home appliance 20 with the automatic registration key received from the mobile terminal 30.

The first server 12 may receive the MAC address and the automatic registration key from the home appliance 20, and may receive the MAC address and the automatic registration key for the home appliance 20 from the mobile terminal 30.

The first server 12 may determine whether the MAC addresses match, and if the MAC addresses match, the first server 12 may determine whether the automatic registration keys are identical to each other. When the automatic registration keys are identical to each other, the first server 12 may complete product registration of the home appliance 20. Subsequently, the first server 12 may download initial personalization information to the home appliance 20.

Figure 10:
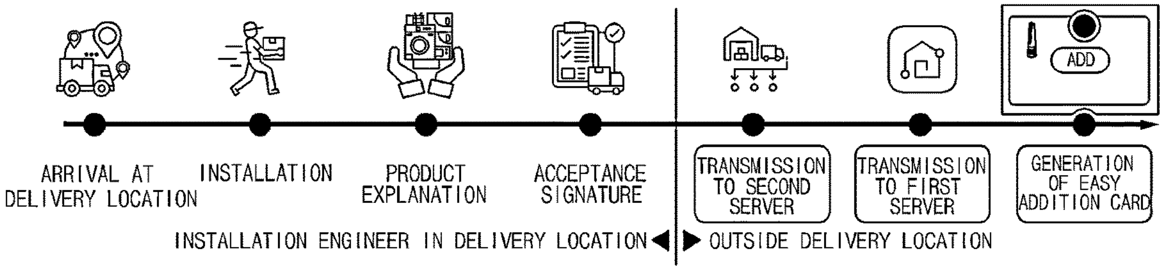
FIG. 10 is a view showing a delivery process of a home appliance.

FIG. 10 is a view showing a delivery process of a home appliance. In this figure, upon arrival at a delivery location, an installation engineer, or other person, installs the home appliance 20, explains the product, obtains a signature of acceptance, and leaves the delivery location. The installation engineer may notify the second server 11 of the completion of the delivery by a specified action, such as scanning a packing box barcode.

Upon completion of the delivery, the delivery information is transmitted to the second server 12 and the first server 11, and the second server 12 may generate an easy addition card 722 for the user to easily register the product through the home appliance management application.

With a single touch of the easy addition card 722, the user may easily register the delivered product and download initial personalization data. For instance, the installation engineer may perform a specified action, such as scanning a packaging box barcode, prior to the product explanation. Accordingly, the transmission of the delivery information and the generation of the easy addition card 722 are completed during the product installation process, and therefore the easy addition card 722 is generated while the installation engineer is still at the delivery location. Thus, the installation engineer may directly guide the customer for product registration through the easy addition card 722, use of the home appliance management application, application of initial personalization, etc. during the product explanation step.

Accordingly, the initial personalization update may be performed automatically at the time of product registration, thereby avoiding confusion for the customer and improving ease of use, even in embodiments where initial personalization is set up.

Figure 11:
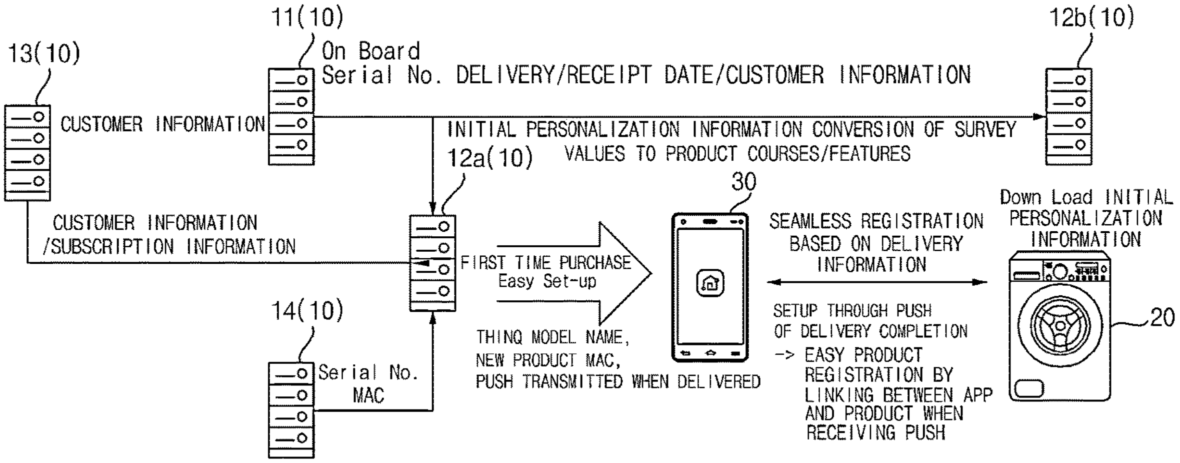
FIG. 11 is a view showing the configuration of a home appliance system including a home appliance according to an embodiment of the present disclosure.

FIG. 11 is a view showing the configuration of a home appliance system including a home appliance according to an embodiment. The home appliance system of FIG. 11 differs from the home appliance system described with reference to FIGS. 1 and 9 in that the server 10 includes a plurality of servers. The following description will focus on this difference in configuration of the server 10.

Referring to FIG. 11, the home appliance system may include a mobile terminal 30, a home appliance 20, first servers 12*a* and 12*b*, a second server 11, a third server 13, and a fourth server 14. That is, the server 10 may include first servers 12*a* and 12*b*, a second server 11, a third server 13, and a fourth server 14.

The first servers 12*a* and 12*b* may include a ThinQ server 12*a* configured to manage a home appliance management application (ThinQ application) and a ThinQ home appliance service server 12*b* configured to directly control the home appliance 20 in linkage with the ThinQ server 12*a*. When a user purchases the home appliance 20, the purchase information of the home appliance 20 may be transmitted to the third server 13, and the third server 13 may transmit the purchase information to the ThinQ server 12*a*.

The second server 11 may include a delivery server (not shown) and a logistics server (not shown). The delivery server may transmit the purchase information and the product information of the home appliance 20 to the logistics server. The product information may include a serial number or a logistics barcode of the home appliance 20.

The delivery server is a server configured to standardize production reference information and to manage integrated production information, which may be divided into a global view to manage production and quality key indicators and a local view to support production execution in the field. The logistics server can transmit delivery-related notifications to the purchasing customers of all products passing through the manufacturer's logistics center.

The fourth server 14 may transmit the MAC address and serial number of each of mass-produced home appliances 20 to the ThinQ server 12*a*. The ThinQ server 12*a* may store the MAC address and the serial number of the home appliance 20 received from the fourth server 14 in a database. That is, the ThinQ server 12*a* may map and store the MAC address and the serial number corresponding to each of a plurality of home appliances 20.

The second server 11 may transmit the delivery information to the first servers 12*a* and 12*b*. In addition, the ThinQ server 12*a* may generate recommended settings information based on the information obtained using the mobile terminal 30 and the ThinQ application. The ThinQ server 12*a* may generate initial personalization information (recommended settings information) by converting survey values into operation courses (operation modes) and features of the home appliance 20.

The ThinQ server 12*a* transmits the initial personalization information to the ThinQ home appliance service server 12*b*. Upon receiving the delivery completion information from the first server 11, the ThinQ server 12*a* may transmit a push alarm, or other message or communication, through the ThinQ application and guide product registration of the home appliance 20.

The ThinQ home appliance service server 12*b* may download the initial personalization information to the home appliance 20 based on the information received from the first server 11 and the ThinQ server 12*a*. For example, the ThinQ home appliance service server 12*b* may receive the delivery completion information from the first server 11 and download initial personalization information to the home appliance 20.

Alternatively, upon receiving the delivery completion information from the first server 11 and receiving an initial personalization download request signal from the ThinQ server 12*a*, the ThinQ home appliance service server 12*b* may download the initial personalization information to the home appliance 20.

Another alternative includes when the ThinQ server 12*a* receives the delivery completion information from the first server 11 and the ThinQ server 12*a* transmits an initial personalization download request signal to the ThinQ home appliance service server 12*b* according to completion of the delivery, the ThinQ home appliance service server 12*b* may download the initial personalization information to the home appliance 20.

Figure 12:
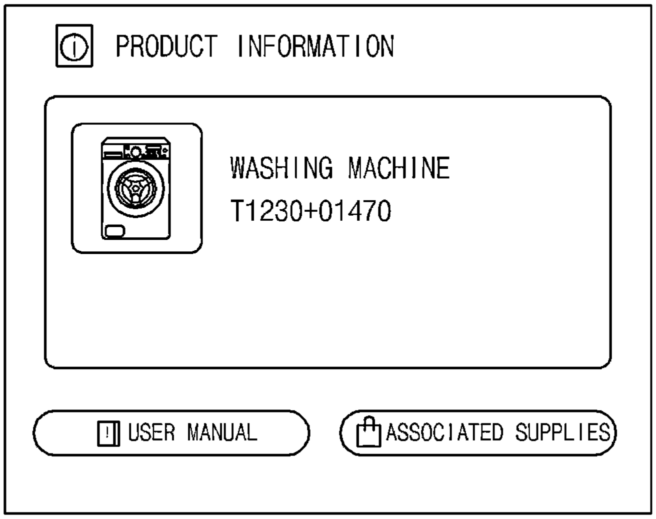
FIGS. 12 to 17 are views showing information and user interface screens provided during a process from purchase or subscription of a home appliance to use by a user.
Figure 13:
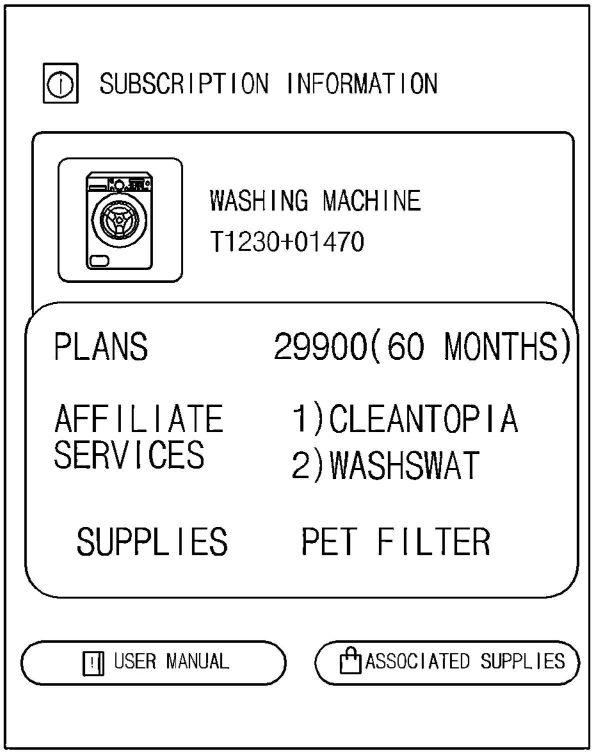

FIGS. 12 to 17 are views showing information and user interface screens provided during a process from purchase or subscription of a home appliance to use by a user. Referring first to FIGS. 12 and 13, these figures show user interface screens provided to a contractor and a recipient when the contractor and the acceptor are different from each other.

A contractor is generally a person who enters into a subscription agreement, and a recipient is a person who acquires (delivers or uses) a product, which may be different from the contractor.

The contractor of the home appliance 20 may be different from the recipient of the home appliance 20, who is an actual user. For example, a daughter may purchase the home appliance 20 and order the home appliance 20 to be delivered to her father's home. In this case, the actual user of the home appliance 20 will be the father who takes delivery of the home appliance 20. Accordingly, based on recipient information included in the delivery information of the home appliance 20, the server 10 or the terminal 30 may generate recommended settings information based on the actual user, the father, and transmit the recommended settings information to the home appliance 20. In this case, the terminal 30 responding to the survey for customized settings may be a terminal corresponding to the recipient information.

If the recipient of the home appliance 20 is different from the purchasing contractor of the home appliance 20, the user interface screen provided to the recipient through his or her terminal 30 may be configured differently from the user interface screen provided to the purchasing contractor through his or her terminal 30.

Referring to FIG. 12, the recipient's onboarding screen may be provided based on product information for the home appliance 20 being delivered.

Referring to FIG. 13, the contractor's onboarding screen may include product information for the home appliance 20 being delivered and contract-related information.

While the contractor may have access to the subscription information, the non-contractor recipient may not have access to the subscription information. Therefore, the user interface screen may vary depending on the contractor's situation.

The recipient may be presented with a survey and response process for customized settings.

FIGS. 14 to 17 illustrate an initial personalization survey process for a washing machine or a dryer.

According to an embodiment, a survey may be conducted during product delivery to determine user preferences and recommend customized settings. For example, the customized settings may include at least one of a list of courses (operation modes), automatic optimization of a course (operation mode), and my own course (operation mode).

Figure 14:
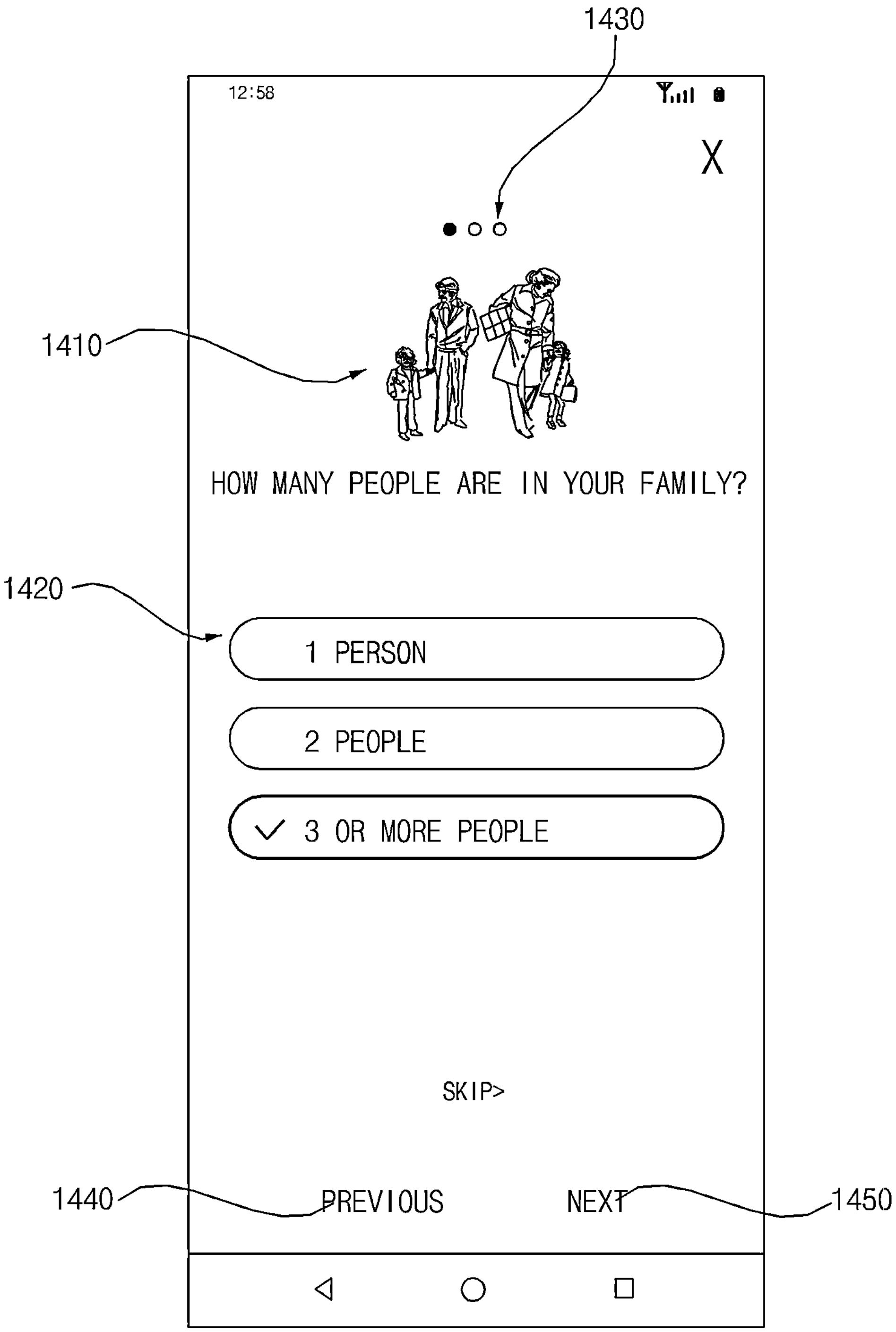
Figure 15:
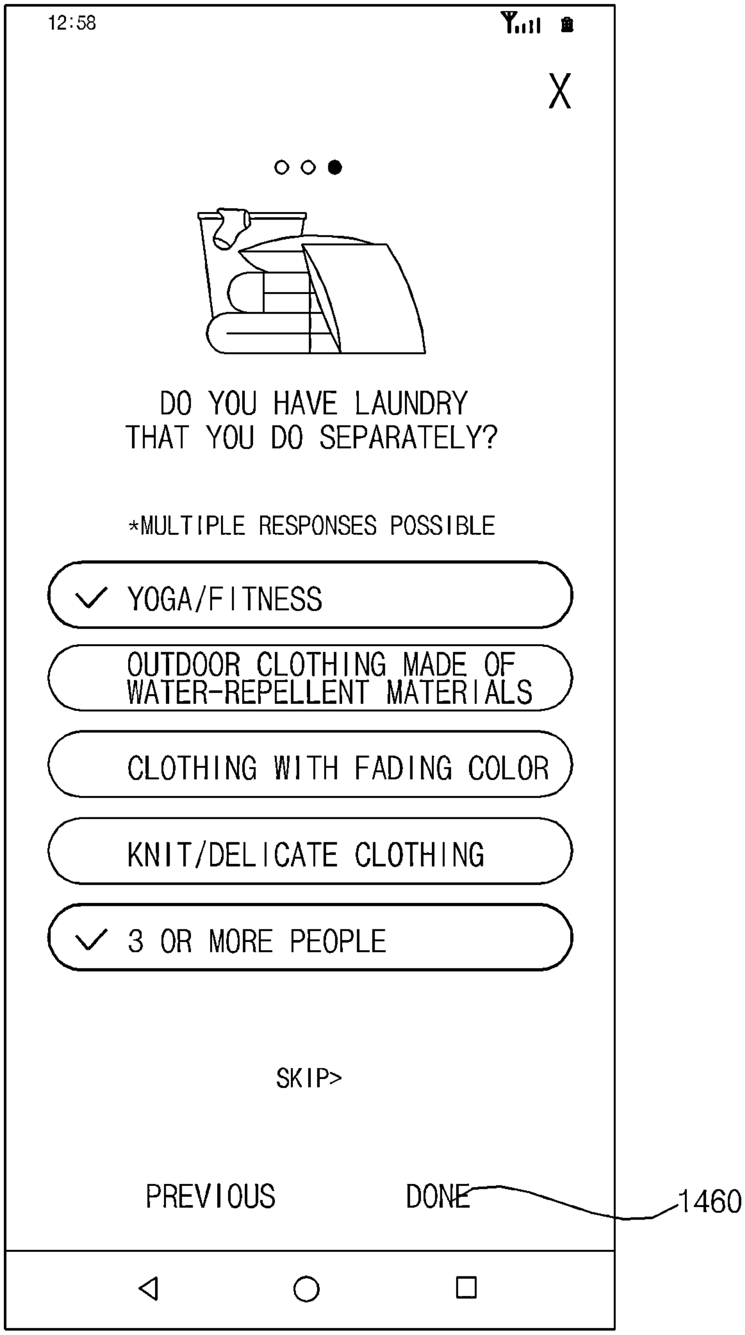

FIGS. 14 and 15 show input screens provided through the server 10 or the terminal 30 during an input process in a course recommendation process of the delivery process (FIG. 3, S320). As shown in FIGS. 14 and 15, the server 10 or the terminal 30 may collect information provided by a user through an input process in which the user inputs his or her information.

The information required by the server 10 or the terminal 30 to determine the recommended settings information may be provided to the server 10 or the terminal 30 through the input process in which the user inputs the information. In the input process, the server 10 or the terminal 30 may provide the user with an input screen configured to display various objects that the user can select, and the user may input the information by selecting any one, or more, of the various objects, and so on.

FIGS. 14 and 15 show a plurality of input screens having different topics. FIGS. 14 and 15 illustrate a first input screen and a third input screen, but the topics on which the user provides information during the input process and the number of input screens based thereon may vary.

The server 10 or the terminal 30 may receive information input by the user in the input process through the input screen. The information may be provided to the server 10 or the terminal 30 through a plurality of input processes in which the user inputs the information.

Referring to FIG. 14, the input screen may include a survey area 1410 for informing the user of the topic of information. The survey area 1410 may display the type of information required from the user, such as text or shapes to indicate the content of the survey. The user may recognize the information, such as text displayed in the survey area 1410, to determine the type of information to be input.

As an example, the input screen may display a survey about family members in the survey area 1410 for inputting how many family members the user has. The input screen may also display at least one selection item 1420 for the user to select. The selection item 1420 may correspond to information corresponding to answers to the survey contents.

For example, the input screen may display a plurality of selection items 1420, and the plurality of selection items 1420 may correspond to different kinds of information. Each selection item 1420 may display text corresponding to an information value thereof such that the user can check the information value for the selection item 1420.

The user may input information to the server 10 or the terminal 30 by checking the survey contents and selecting a selection item 1420 that corresponds to the information the user wishes to input. For instance, on the input screen, the user may check the contents of the survey about the number of family members from the wording in the survey area 1410, and may select a selection item 1420 corresponding to the user from among the plurality of selection items 1420 corresponding to any one of one, two, and three or more family members.

In an embodiment, the topic of requesting information from the user may not be a direct topic about a course, and the server 10 or the terminal 30 may select a course that is beneficial or necessary to the user from among various courses through the survey process and provide the same to the user as recommended settings information.

The server 10 or the terminal 30 may collect the information through the user's selection of a target from among the plurality of selection items 1420 in the input process in which the plurality of selection items 1420 are provided to the user for selection.

That is, as described above, the server 10 or the terminal 30 may provide the user with screens for different topics, and the user may input information by selecting the plurality of selection items 1420 provided on each screen. The input screen may display an item 1430 indicating the number of screens in a questioning process and the current location.

In addition, the server 10 or the terminal 30 may receive a plurality of pieces of information from the user through a plurality of input processes in which the user inputs the information, and may determine at least one piece of recommended settings information based on the plurality of pieces of information.

That is, the server 10 or the terminal 30 may determine at least one piece of recommended settings information to be recommended to the user among a plurality of courses pre-stored in the server 10 or the terminal 30 based on the plurality of different kinds of information collected during the input process. For example, a plurality of pieces of recommended settings information may be determined based on any one of the plurality of pieces of information input by the user, and one piece of recommended settings information may be determined based on at least two of the plurality of pieces of information.

The input screen may display a next item 1450, a previous item 1440, and a skip item. The next item 1450 may be an object for confirming information input by the user by selecting any one of the plurality of selection items 1420.

For example, when the user selects a user-appropriate selection item 1420 from among the plurality of selection items 1420 and selects the next item 1450, the server 10 or the terminal 30 may provide an input screen corresponding to the next topic after the current topic or terminate the input process if the survey is the last survey. Alternatively, if the survey is the last survey, the next item 1450 may be converted into the completion item 1460 and be displayed.

When the previous item 1440 is selected, the server 10 or the terminal 30 may re-display the input screen that was displayed immediately prior to the input screen currently being displayed on the server 10 or the terminal 30, such as the input screen being displayed on the terminal 30.

When the skip item is selected, the input screen of the next topic may be provided without inputting information about that topic, or the input process may be terminated if the input screen is the last input screen. That is, the server 10 or the terminal 30 may proceed to the next process without providing information of the corresponding topic when the skip item is selected by the user on the input screen.

In the input process, the server 10 or the terminal 30 may provide a plurality of input screens, and a plurality of information inputs may be performed by the user. The plurality of input screens may be related to different topics, and information about various topics may be collected by the user. For example, in the embodiment of the washing machine, information input by the user may include at least one of the number of people in the user's family, the presence of pets, the presence of infants, and the main type of clothing.

The server 10 or the terminal 30 may collect information about the user's life, environment, etc. even before the installation of the home appliance 20 as described above, and analyze an appropriate course and provide the same to the user. The server 10 or the terminal 30 may determine recommended settings information for the user based on the user's information input through the input process.

Through the input process, the server 10 or the terminal 30 may determine a plurality of pieces of recommended settings information based on the information, and the course group may include a plurality of pieces of recommended settings information. The course group may include courses that include the recommended settings information and are determined by the server 10 or the terminal 30 to be suitable for the user, among the plurality of courses prestored in the server 10 or the terminal 30.

Figure 16:
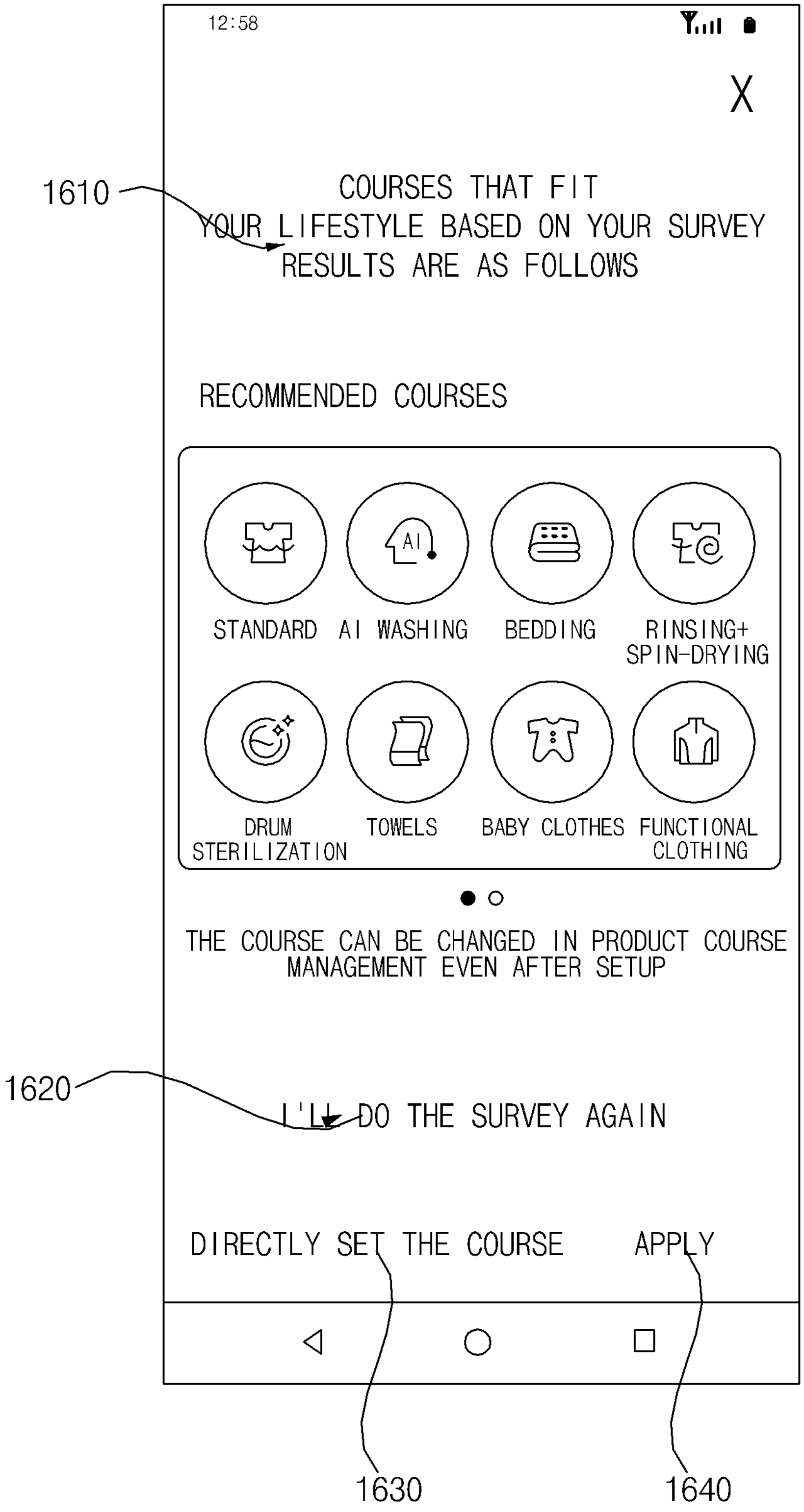

FIG. 16 shows suggestion screen 1610 displaying the courses of the course group. The suggestion screen 1610 allows the user to easily check courses of the course group suggested by the server 10 or the terminal 30. In addition to the recommended settings information, the course group may include a default course. The default course may be a course that is basically required to use the home appliance 20, which may be predetermined by the server 10 or the terminal 30.

The default course may be pre-stored in the server 10 or the terminal 30 regardless of information input by the user and recommended settings information. Accordingly, the course group may include a default course predetermined by the server 10 or the terminal 30 among the plurality of courses and the recommended settings information.

The various courses stored on the server 10 or the terminal 30 may include a user course. The user course may be a course in which the user directly determines setting values for various options and stores the same in the server 10 or the terminal 30.

A user-determined course may be included in the course group intended to be provided on the home appliance 20 due to the nature thereof. That is, the course group may include a user course in which the user determines default setting values for options through the server 10 or the terminal 30.

FIG. 16 shows a screen according to a suggestion process in a settings recommendation process for determining recommended settings information for the user and providing the course group.

The server 10 or the terminal 30 may perform the settings recommendation process to provide the course group including the recommended settings information to the user, and may output the suggestion screen 1610 during the suggestion process in the settings recommendation process.

The user may perform the settings recommendation process through the server 10 or the terminal 30 even before the home appliance 20 is delivered, and may be provided with the suggestion screen 1610 through the terminal 30.

The suggestion screen 1610 may display text indicating that a group of courses for the user may be available through the server 10 or the terminal 30, and may include an applying item 1640 for the user to determine to proceed with the settings recommendation process, a direct course setting item 1630 for the user to directly input settings, and a survey resumption item 1620 for the user to perform the survey from the beginning.

Figure 17:
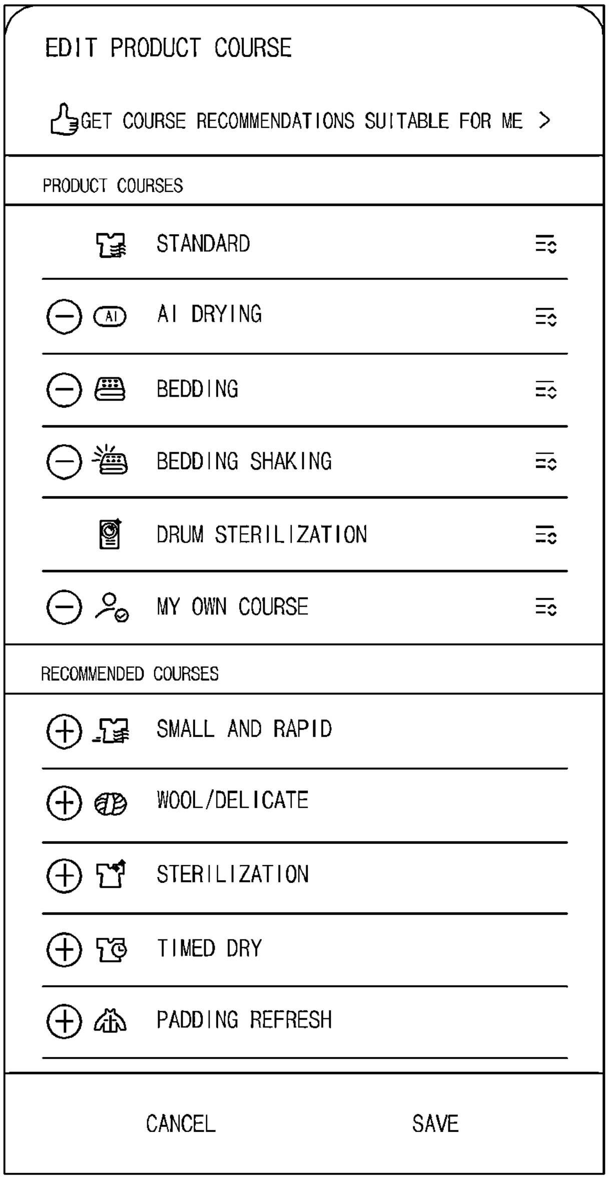

When the applying item 1640 is selected, the server 10 or the terminal 30 may store the suggested settings as recommended settings information. When the survey resumption item 1620 is selected, the terminal 30 may start the survey process again from the beginning, and when the direct course setting item 1630 is selected, the terminal 30 may provide a user interface screen for editing and setting up a course or the like, as shown in FIG. 17.

If the user does not respond to the survey or does not perform any input related to the settings, the server 10 or the terminal 30 may provide the user with a course group that includes default courses preset in the server 10 or the terminal 30.

While FIGS. 14 to 17 illustrate the survey for course settings for the washing machine and the course recommendation process based on the survey, the present disclosure is not limited thereto, and customized settings may be provided for each home appliance.

For example, for a refrigerator, questions about diet or food combinations, room ambiance, interests, and the like may be asked, and settings for a refrigerator compartment temperature, a color mode, and a cover screen image may be recommended based on responses.

As another example, for an air purifier, whether you have pets or a baby, your interests, and your preferred type of cleaning (e.g., during bedtime, air purification based on smoke states, air purification based on indoor air, and air purification based on outdoor air) may be asked, and settings for a color mode, and a cover screen image may be recommended based on responses.

According to at least one of the embodiments, various kinds of information may be provided to the user during product delivery, and recommended settings information determined during delivery may be easily applied to the delivered product.

According to at least one of the embodiments, it is possible to easily apply user's customized settings to a home appliance.

According to at least one of the embodiments, it is possible to effectively check and conveniently provide settings necessary or suitable for a user among various settings available on the home appliance.

According to at least one of the embodiments, it is possible to easily and quickly register a home appliance product with a server.

According to at least one of the embodiments, it is possible to easily register a product delivered to a customer based on information related to delivery with the server.

According to at least one of the embodiments, it is possible to easily apply predetermined recommended settings information to a delivered product.

According to at least one of the embodiments, it is possible to provide various kinds of information to the user during product delivery.

Various other effects are directly or implicitly disclosed in the detailed description of the embodiments of the present disclosure.

It will be apparent that, although the preferred embodiments have been shown and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. A home appliance system comprising:
a home appliance;
a terminal configured to determine recommended settings information for the home appliance based on input information; and
a server configured to:
receive the recommended settings information for the home appliance from the terminal prior to delivery of the home appliance being completed and prior to a communication connection being established between the server and the home appliance;
store the received recommended settings information; and
transmit the recommended settings information to the home appliance in response to receiving delivery completion information indicating that the delivery of the home appliance has been completed and based on the communication connection being established between the server and the home appliance,
wherein the home appliance applies the recommended settings information.

2. The home appliance system of claim 1, wherein the server comprises:
a first server configured to store the recommended settings information and to transmit the recommended settings information to the home appliance; and
a second server configured to transmit delivery information to the first server.

3. The home appliance system of claim 1, wherein the terminal is configured to:
display a first user interface screen configured to guide registration of the home appliance using a management application, based on receiving delivery completion information of the home appliance; and
display a second user interface screen configured to provide the recommended settings information, based on the management application being executed after the home appliance is registered.

4. The home appliance system of claim 1, wherein the terminal is configured to:
display a first user interface screen configured to guide registration of the home appliance using a management application, based on receiving delivery completion information of the home appliance; and
display a second user interface screen configured to provide the recommended settings information, based on the home appliance being registered.

5. The home appliance system of claim 1, wherein the terminal is configured to:
register the home appliance with a management application and display a user interface screen configured to provide the recommended settings information, based on receiving delivery completion information of the home appliance.

6. The home appliance system of claim 1, wherein the server is configured to transmit the recommended settings information to the home appliance, based on recipient information of the home appliance.

7. The home appliance system of claim 6, wherein the terminal is a terminal corresponding to the recipient information.

8. The home appliance system of claim 6, wherein a user interface screen provided to a recipient of the home appliance is configured differently from a user interface screen provided to a purchasing contractor of the home appliance, based on the recipient of the home appliance being different from the purchasing contractor of the home appliance.

9. The home appliance system of claim 1, wherein the terminal provides usage tips information of the home appliance.

10. A home appliance system comprising:
a home appliance;
a terminal configured to receive predetermined information for the home appliance from a user; and
a server configured to:
receive the predetermined information from the terminal prior to delivery of the home appliance and prior to a communication connection being established between the server and the home appliance;
store recommended settings information based on the predetermined information; and
transmit the recommended settings information to the home appliance in response to receiving delivery completion information indicating that delivery of the home appliance has been completed and based on the communication connection being established between the server and the home appliance,
wherein the home appliance applies the recommended settings information.

11. The home appliance system of claim 10, wherein the server comprises:
a first server configured to store the recommended settings information and to transmit the recommended settings information to the home appliance; and
a second server configured to transmit delivery information to the first server.

12. The home appliance system of claim 10, wherein the terminal is configured to:
display a first user interface screen configured to guide registration of the home appliance using a management application, based on receiving delivery completion information of the home appliance; and
display a second user interface screen configured to provide the recommended settings information, based on the management application being executed after the home appliance is registered.

13. The home appliance system of claim 10, wherein the terminal is configured to:
display a first user interface screen configured to guide registration of the home appliance using a management application, based on receiving delivery completion information of the home appliance; and
display a second user interface screen configured to provide the recommended settings information, based on the home appliance being registered.

14. The home appliance system of claim 10, wherein the terminal is configured to:
register the home appliance with a management application and display a user interface screen configured to provide the recommended settings information, based on receiving delivery completion information of the home appliance.

15. The home appliance system of claim 10, wherein the server is configured to transmit the recommended settings information to the home appliance, based on recipient information of the home appliance.

16. The home appliance system of claim 15, wherein the terminal is a terminal corresponding to the recipient information.

17. The home appliance system of claim 15, wherein a user interface screen provided to a recipient of the home appliance is configured differently from a user interface screen provided to a purchasing contractor of the home appliance, based on the recipient of the home appliance being different from the purchasing contractor of the home appliance.

18. The home appliance system of claim 10, wherein the terminal provides usage tips information of the home appliance.

19. A server for use with a home appliance, the server comprising:

a communication interface configured to receive predetermined information input from a terminal prior to delivery of the home appliance being completed and prior to a communication connection being established between the server and the home appliance; and a memory configured to store recommended settings information based on the information, wherein the server is configured to:

transmit, using the communication interface, the recommended settings information to the home appliance in response to receiving delivery completion information indicating that delivery of the home appliance has been completed and based on the communication connection being established between the server and the home appliance.

20. The server of claim 19, further comprising a processor configured to determine the recommended settings information based on information received through the communication interface.

* * * * *